US008993066B2

(12) United States Patent
Yang et al.

(10) Patent No.: US 8,993,066 B2
(45) Date of Patent: Mar. 31, 2015

(54) MICROENCAPSULATION OF REACTIVE DIISOCYANATES AND THE APPLICATION TO SELF-HEALING ANTICORROSION COATINGS

(71) Applicant: Nanyang Technological University, Singapore (SG)

(72) Inventors: Jinglei Yang, Singapore (SG); Mingxing Huang, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 13/755,251

(22) Filed: Jan. 31, 2013

(65) Prior Publication Data

US 2013/0196071 A1    Aug. 1, 2013

Related U.S. Application Data

(60) Provisional application No. 61/593,530, filed on Feb. 1, 2012.

(51) Int. Cl.
*C09D 5/08* (2006.01)
*B01J 13/02* (2006.01)
(Continued)

(52) U.S. Cl.
CPC . *C09D 5/08* (2013.01); *B01J 13/02* (2013.01); *B01J 13/16* (2013.01); *C09D 7/1291* (2013.01);
(Continued)

(58) Field of Classification Search
CPC .............. C08G 18/10; C08G 18/8067; C08G 2190/00; C08G 2330/00; C08G 2170/80; C09D 175/04; C08L 75/04; B01J 2/06; B01J 2/006; C08J 11/04; C08J 2375/04; C08J 9/32; C09J 175/04; C09J 189/00
USPC ......... 428/402–402.24, 403, 404, 407, 321.1, 428/474.4; 427/331, 389.9, 212, 427/213–213.36, 483, 256; 264/534, 5, 41, 264/4–4.7; 424/400, 408, 450, 451, 455, 424/93.7, 184.1, 497, 489, 501, 490, 491, 424/492, 493, 494, 495
See application file for complete search history.

(56) References Cited

U.S. PATENT DOCUMENTS 3,409,461 A    11/1968    Mehlo et al.
4,599,271 A    7/1986    Chao
(Continued)

FOREIGN PATENT DOCUMENTS

WO    2009140835 A1    11/2009

OTHER PUBLICATIONS

Yang et al, Macromolecules 2008, 41, 9650-9655.*
(Continued)

*Primary Examiner* — James J Seidleck
*Assistant Examiner* — S. Camilla Pourbohloul
(74) *Attorney, Agent, or Firm* — Sam K. Tahmassebi; TechLaw LLP

(57) ABSTRACT

The disclosure provides a polyurethane microcapsule consisting of a polymerization product of methylene diphenyl diisocyanate (MDI) prepolymer with a polyol, the polyurethane microcapsule comprising a liquid isocyanate compound encapsulated within the microcapsule. The disclosure also provides self-healing coating compositions comprising such polymeric microcapsules and methods of preventing or slowing corrosion using such coating compositions.

14 Claims, 10 Drawing Sheets

(51) Int. Cl.
| | |
|---|---|
| *B01J 13/16* | (2006.01) |
| *C09D 7/12* | (2006.01) |
| *C08G 18/70* | (2006.01) |
| *C08G 18/08* | (2006.01) |
| *C08G 18/10* | (2006.01) |
| *C09D 175/04* | (2006.01) |
| *C08K 9/10* | (2006.01) |

(52) U.S. Cl.
CPC ............... *C08K 9/10* (2013.01); *C08G 18/703* (2013.01); *C08G 18/0866* (2013.01); *C08G 18/10* (2013.01); *C09D 175/04* (2013.01)
USPC .......................... 427/386; 427/385.5; 264/4.7

(56) References Cited

U.S. PATENT DOCUMENTS

| | | | |
|---|---|---|---|
| 6,518,330 | B2 | 2/2003 | White et al. |
| 8,362,113 | B2 | 1/2013 | Xing et al. |
| 2004/0007784 | A1 | 1/2004 | Skipor et al. |
| 2005/0256252 | A1* | 11/2005 | Williams ................ 524/507 |
| 2006/0252852 | A1 | 11/2006 | Braun et al. |
| 2007/0166542 | A1 | 7/2007 | Braun et al. |
| 2008/0234406 | A1* | 9/2008 | Rawlins et al. ............ 523/201 |
| 2011/0147043 | A1* | 6/2011 | Perry et al. ................ 174/119 C |

OTHER PUBLICATIONS

Gunatillake et al., Biomedical Applications of Polyurethanes, Chapter 6, p. 160-174, 2001.*
Huang and Yang, Facile microencapsulation of HDI for self-healing anticorrosion coatings. J Mater Chem. Aug. 14, 2011;21(30)11123-11130.
Moghbeli et al., Microencapsulation of Ethion by Interfacial Polymerization Utilizing Potassium Phthalimide-N-oxyl (PPINO) as a Promoter. Iran J Chem Engineer. 2011 (Autumn);8(4):34-42.
Sondari et al., Polyurethane microcapsule with glycerol as the polyol component for encapsulated self healing agent. Intern J Engineer Technol. 2010;2(6):466-471.
Yang et al., Microencapsulation of Isocyanates for Self-Healing Polymers. Macromolecules Nov. 25, 2008;41(24):9650-9655.
Yang et al., Nanoencapsulation of blocked isocyanates through aqueous emulsion polymerization. eXPRESS Polym. Lett. 2008;2(5):349-356.
Blaiszik et al., Nanocapsules for self-healing materials. Composites Sci Technol. 2008; 68:978-986.
Brown et al., In situ poly(urea-formaldehyde) microencapsulation of dicyclopentadiene. J Microencapsul. Nov.-Dec. 2003;20(6): 719-730.
Caruso et al., Robust, Double-Walled Microcapsules for Self-Healing Polymeric Materials. ACS Appl Mater Interfaces. Apr. 2010;2(4):1195-1199.
Cheong and Kim, Synthesis of core—shell polyurethane—urea nanoparticles containing 4,4'-methylenedi-p-phenyl diisocyanate and isophorone diisocyanate by self-assembled neutralization emulsification. Chem Commun (Camb). Nov. 7, 2004;(21):2484-2485.
Cho et al., Polydimethylsiloxane-Based Self-Healing Materials. Adv Mater. Apr. 2006;18(8):997-1000.
Cho et al., Self-Healing Polymer Coatings. Adv Mater. 2009;21:645-649.
Ghosh and Urban, Self-Repairing Oxetane-Substituted Chitosan Polyurethane Networks. Science. Mar. 13, 2009;323(5920):1458-1460.
Johnsen and Schmid, Preparation of polyurethane nanocapsules by miniemulsion Polyaddition. J Microencapsul. Dec. 2007;24(8):731-742.
Kessler et al., Self-healing structural composite materials. Composites: Part A—Appl Sci Manufact. Aug. 2003;34(8):743-753.
Kuo et al., Effect of Surfactants on the Particle Sizes of Red #170 Polyurea Microcapsules. J Appl Polymer Sci. 1994;52:1165-1173.
McIlroy et al., Microencapsulation of a Reactive Liquid-Phase Amine for Self-Healing Epoxy Composites. Macromolecules 2010;43(4):1855-1859.
Rule et al., Effect of microcapsule size on the performance of self-healing polymers. Polymer 2007;48:3520-3529.
Suryanarayana et al., Preparation and characterization of microcapsules containing linseed oil and its use in self-healing coatings. Prog Organic Coatings 2008; 63:72-78.
Tcholakova et al., Role of Surfactant Type and Concentration for the Mean Drop Size during Emulsification in Turbulent Flow. Langmuir. Aug. 31, 2004;20(18):7444-7458.
White et al., Autonomic healing of polymer composites. Nature. Feb. 15, 2001;409(6822):794-797.
Yoshizawa et al., Membrane formation mechanism of cross-linked polyurea microcapsules by phase separation method. J Microencapsul. May 2004;21(3):241-249.
Yuan et al., Preparation and characterization of poly(urea-formaldehyde) microcapsules filled with epoxy resins. Polymer Jul. 2006;47(15):5338-5349.

* cited by examiner

MICROENCAPSULATION OF REACTIVE DIISOCYANATES AND THE APPLICATION TO SELF-HEALING ANTICORROSION COATINGS

CROSS REFERENCE TO RELATED APPLICATIONS

This application claims the benefit of priority under 35 U.S.C. §119(e) to U.S. Provisional Application No. 61/593,530, titled "Microencapsulation of reactive diisocyanates and the application to self-healing anticorrosion coatings," filed on 1 Feb. 2012, the entire disclosure of which is hereby incorporated by reference in its entirety for all purposes.

FIELD OF THE INVENTION

The present invention relates generally to microcapsules and a method of microencapsulating liquid isocyanate as core material. The invention also relates to a simplified method for microencapsulation of reactive liquid-phase diisocyanate monomers in a polyurethane shell by means of an interfacial polymerization process in an oil-in-water emulsion system. The invention also provides a process for manufacturing a self-healing anticorrosion coating and a respective composition. In accordance with the process of making a self-healing anticorrosion coating, the microcapsules described herein may be dispersed in a resin to yield a self-healing coating. The self-healing effect can be used for corrosion protection application.

BACKGROUND OF THE DISCLOSURE

Self-healing materials have received considerable attention due to their great potential to diminish degradation and reduce the maintenance cost. Since the first generation self-healing material based on the ring opening metathesis polymerization (ROMP) of encapsulated dicyclopentadiene (DCPD) in the presence of Grubbs' catalyst particles (S. R. White, N. R. Sottos, P. H. Geubelle, J. S. Moore, M. R. Kessler, S. R. Sriram, E. N. Brown and S. Viswanathan, Nature, 2001, 409, 794-797) microencapsulation has been one of the most efficient and widely used approaches in self-healing materials development. Poly(urea-formaldehyde) (PUF) microcapsules containing DCPD as healing agent were prepared through an in situ polymerization in oil-in-water emulsion (E. Brown, M. Kessler, N. Sottos and S. White, J. Microencapsulation, 2003, 20, 719-730; M. R. Kessler, N. R. Sottos and S. R. White, Composites: Part A, 2003, 34, 743-753) and the capsules size was further reduced to nanometer scale with the assistance of a sonication technique (B. J. Blaiszik, N. R. Sottos and S. R. White, Compos. Sci. Technol., 2008, 68, 978-986). Linseed oil (C. Suryanarayana, K. C. Rao and D. Kumar, Prog. Org. Coat., 2008, 63, 72-78), amines (D. A. McIlroy, B. J. Blaiszik, M. M. Caruso, S. R. White, J. S. Moore and N. R. Sottos, Macromolecules, 2010, 43, 1855-1859) and epoxy resins (L. Yuan, G. Liang, J. Xie, L. Li and J. Guo, Polymer, 2006, 47, 5338-5349) were also microencapsulated for self-healing applications. To avoid the contamination of catalyst by the host matrix, a dual capsule system was reported (S. Cho, H. Andersson, S. White, N. Sottos and P. Braun, Adv. Mater., 2006, 18, 997-1000; S. H. Cho, S. R. White and P. V. Braun, Adv. Mater., 2009, 21, 645-649) and this approach has shown good self-healing and corrosion protection features. Most of the capsules applied for self-healing purpose so far were made from PUF, polyurethane (PU) and polyurea. To overcome this limitation, a double-walled polyurethane-poly(urea formaldehyde) (PU-PUF) microcapsule was recently developed through the combination of interfacial polymerization of PU and in situ polymerization of PUF in a single batch reaction (M. M. Caruso, B. J. Blaiszik, H. Jin, S. R. Schelkopf, D. S. Stradley, N. R. Sottos, S. R. White and J. S. Moore, ACS Appl. Mater. Interfaces, 2010, 2, 1195-1199.) Other approaches such as hollow glass fiber embedment, microvascular system, and electrospun hollow fibers have also been extensively investigated for self-healing materials development, and more recently there was reported an oxetane-substituted chitosan precursor incorporated PU showing good scratch closure performance within half an hour under sunlight (B. Ghosh and M. Urban, Science, 2009, 323, 1458-1460).

Isocyanates are reactive with moisture, and can be used as a potential healing agent to develop one-part, catalyst-free self-healing materials that are exposed to moist or aqueous environments. On the other hand, however, the high reactivity of isocyanates brings the difficulty for processing. Previous research on encapsulation of isocyanate has been mainly restricted to its blocked form or solid state (I. W. Cheong and J. H. Kim, Chem. Commun., 2004, 2484-2485; H. Yang, S. Mendon and J. Rawlins, eXPRESS Polym. Lett., 2008, 2, 349-356.

Yang et al. for the first time reported in Macromolecules, 2008, 41, 9650-9655, the microencapsulation of liquid isocyanate monomer. Less reactive isophorone diisocyanate (IPDI) was encapsulated by polyurethane microcapsules based on the polymerization of toluene diisocyanate (TDI) prepolymer that was cautiously in-house synthesized. However, there is still a need to provide further microcapsules that are suitable for the microencapsulation of liquid isocyanate monomer for instant and effective corrosion protection of coating upon damage event or for extended service life of corrosion protection of undamaged coating. If there is damage, such microcapsules serve as healing source to seal the damage in the coating. If there is no damage, the microcapsules can trap and react with slowly diffused water/moisture in the coating to extend the service life thereof.

SUMMARY OF THE INVENTION

The present invention addresses these needs by providing new and improved microcapsules, coating compositions comprising such microcapsules and methods for preventing or lowering the grade of corrosion.

In a first aspect, the disclosure provides a polyurethane microcapsule consisting of a polymerization product of methylene diphenyl diisocyanate (MDI) prepolymer with a polyol, the polyurethane microcapsule comprising a liquid isocyanate compound encapsulated within the microcapsule.

In a second aspect, the disclosure provides a method of encapsulating a liquid isocyanate compound in a polymer microcapsule, the method comprising —forming an oil-in-water emulsion containing a mixture of a methylene diphenyl diisocyanate (MDI) prepolymer and the liquid isocyanate compound, —adding a polyol to the oil-in-water emulsion, and —polymerizing the methylene diphenyl diisocyanate (MDI) prepolymer with the polyol by interfacial polymerization to form the polymeric microcapsule shell, thereby encapsulating the liquid isocyanate compound in the formed polymeric microcapsule.

In a third aspect, the disclosure provides a method of preventing or slowing corrosion, the method comprising applying a coating composition on a substrate, wherein the coating composition comprises polymeric microcapsules consisting of a polymerization product of methylene diphenyl diisocyanate (MDI) prepolymer with a polyol, the microcapsule comprising a liquid isocyanate compound encapsulated within the microcapsule.

In a fourth aspect, the disclosure provides a coating composition comprising polymeric microcapsules consisting of a polymerization product of methylene diphenyl diisocyanate (MDI) prepolymer with a polyol, the microcapsule comprising a liquid isocyanate compound encapsulated within the microcapsule.

In yet another aspect, the disclosure provides a polymeric microcapsule, the polymeric microcapsule comprising hexamethylene diisocyanate encapsulated within the microcapsule.

In yet another aspect, the disclosure provides a method of preventing or slowing corrosion, the method comprising applying a coating composition on a substrate, wherein the coating composition comprises hexamethylene diisocyanate encapsulated within the microcapsule.

In still another aspect, the disclosure provides a coating composition comprising polymeric microcapsules, the microcapsule comprising hexamethylene diisocyanate (as liquid isocyanate compound) encapsulated within the microcapsule.

DESCRIPTION OF THE DRAWINGS

The invention will be better understood with reference to the detailed description when considered in conjunction with the non-limiting examples and the accompanying drawings, in which.

DETAILED DESCRIPTION

Figures 1A, 1B, 1C:
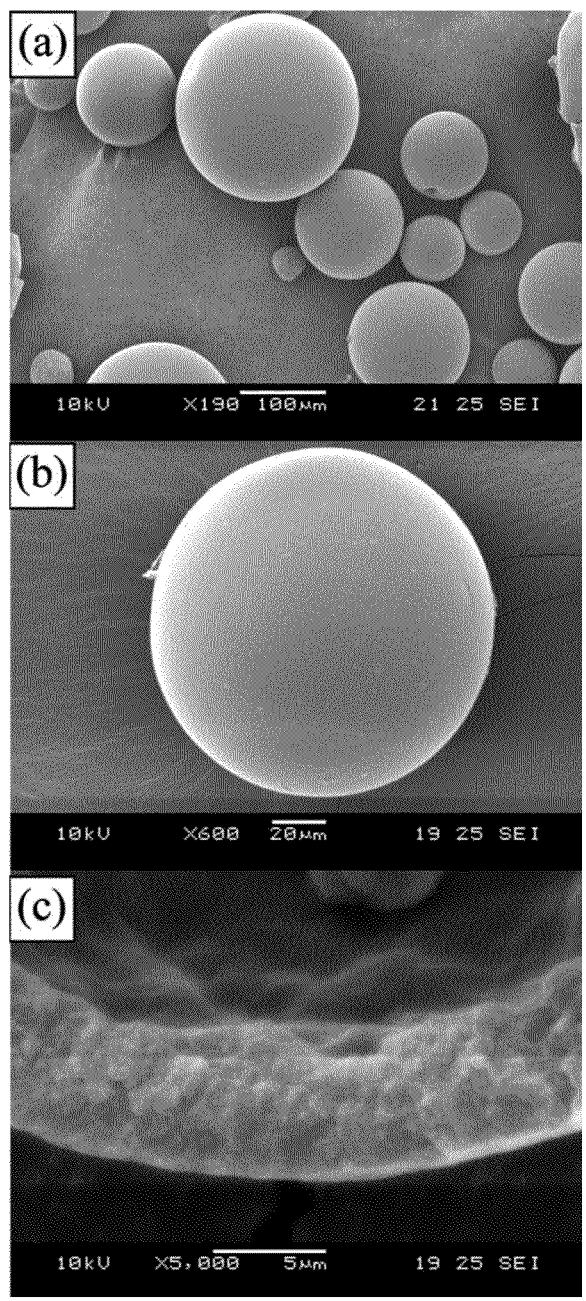
FIG. 1 (scanning electron microscope (SEM) pictures) shows the morphology of microcapsules of the invention prepared from MDI prepolymer and 1,4-butanediol, with FIG. 1(a) showing these spherical shaped microcapsules, FIG. 1(b) showing a zoomed in image showing smooth outer surface, and FIG. 1(c) showing a shell wall profile of these microcapsules.
FIG. 1(d) shows microcapsules of the invention prepared from MDI prepolymer and glycerol.
FIG. 1(e) shows microcapsules of the invention prepared from MDI prepolymer and pentaerythritol.
FIG. 1(f) shows microcapsules of the invention prepared from MDI prepolymer and polyvinyl alcohol. The polyvinylalcohol acted as both raw material of shell and surfactant in the aqueous solution used for the synthesis of the microcapsules shown in FIG. 1(f) while the microcapsules shown in FIGS. 1(a) to 1(e) were synthesized in aqueous solution with gum arabic as surfactant)

The present invention provides a polyurethane microcapsule consisting of a polymerization product of methylene diphenyl diisocyanate (MDI) prepolymer with a polyol, the polyurethane microcapsule comprising a liquid isocyanate compound encapsulated within the microcapsule. Any suitable isocyanate compound can be encapsulated in the polyurethane microcapsule, as long as the chosen reaction conditions allow the encapsulation of the isocyanate in the (formed) microcapsule. The isocyanate compound can either be compound that is (a) liquid under the conditions chosen for the encapsulation process or a compound which is as such (a) solid but can be liquefied within the encapsulation process. For example, a solid isocyanate might be dissolved in a reaction mixture used for the encapsulation process. After encapsulation, the isocyanate compound is usually in the liquid state. This allows the microcapsules to be used for self-healing applications, in which the isocyanate compound exits from the capsule, once the shell of the capsule is ruptured or damaged, for example, by physical or mechanical interaction or by a chemical process, and then reacts, for example, with moisture from the environment to form a protective polymer. In typical embodiments, the isocyanate compound is a monomeric diisocyanate compound or a triisocyanate compound or a polyisocyanate compound. Examples of suitable isocyanate compounds, include, but are not limited to methane diphenyl diisocyanate (MDI), hexamethylene diisocyanate (HDI), isophorone diisocyanate (IPDI), toluene diisocyanate (TDI) (any of the five possible isomers thereof, for example, 2,4-TDI toluene diisocyanate or 2,6-toluene diisocyanate), 1,5-naphthalene diisocyanate (NDI), 1,4-phenylene diisocyanate (PDI), hexahydrotoluylene diisocyanate ($H_6$TDI), hydrogenate MDI, trimethyl hexamethylene diisocyanate, tetramethyl xylylene isocyanate, tetramethyl xylylene diisocyanate, xylylene diisocyanate, isocyanate dimers, isocyanate trimers, polyisocyanates, polydiisocyanates and combinations thereof. In accordance with the above, in some embodiments the isocyanate is an unblocked compound/monomer, for example, unmodified methane diphenyl diisocyanate (MDI), hexamethylene diisocyanate (HDI), isophorone diisocyanate (IPDI), or toluene diisocyanate (TDI). In other embodiments, the isocyanate compound can be a blocked isocyanate compound as described in US Patent application 2008/0234406. In some embodiments, diisocyanates (blocked or unblocked) are used that have a reactivity that is essentially the same (similar) or less than unblocked hexamethylene diisocyanate. The reactivity of the diisocyanate can be determined and compared to the reactivity of hexamethylene diisocyanate empirically, for example, by including the diisocyanate compound (blocked or unblocked) in an oil-in-water emulsion as described herein and determining whether the diisocyanate is encapsulated by interfacial polymerization within a polyurethane microcapsule as described herein.

Any methylene diphenyl diisocyanate (MDI) prepolymer can be used in the invention for the preparation of polymeric microcapsules as described here. Any of the three isomers of methylene diphenyl diisocyanate, 2,2'-MDI, 2,4'-MDI, and 4,4'-MDI alone or combinations thereof can be used for the preparation of the pre-polymer. A suitable prepolymer of MDI can be of any molecular weight, as long as the prepolymer contains a sufficient number of isocyanate groups (NCO content) and the isocyanate groups have sufficient reactivity (reactivity of NCO) to react with a polyol as explained below to form a polyurethane capsule (shell) in which the chosen diisocyanate compound is encapsulated by interfacial polymerization. Suitable prepolymers of MDI are commercially available and include, for example, but are not limited to, the prepolymers sold by Huntsman Corporation under the trademark Suprasec such as Suprasec 2644, MDI prepolymers sold by Bayer Material Science under the trademark Desmodur® such as Desmodur VP LS 2086, MDI prepolymers sold by Dow Polyurethanes under the trademark ISONATE®, for example ISONATE 181, or MDI prepolymers sold by BASF AG under the trademark Lupranate®, for example Lupranate 5050.

Any polyol that is able to react with an MDI prepolymer to form a polyurethane polymer can be used in the present invention. The polyol can, for example, be a diol, a triol but also a polyol having four, five or six reactive hydroxyl groups available for the reaction with the isocyanate groups of the MDI prepolymer. Examples of suitable diols include, but are not limited to, 1,4-butanediol, ethylene glycol, diethylene glycol, triethylene glycol, tetraethylene glycol, propylene glycol, tripropylene glycol, 1,3-propanediol, 1,3-butanediol, 1,4-butanediol, neopentyl glycol, 1,6-hexanediol, 2-ethyl-1,3-hexanediol, 1,4-cyclohexanedimethanol and combinations of these diols. Examples of suitable triols include, but are not limited to, glycerol (cf., Example 1.3 or also Dewi Sondari et al., International Journal of Engineering and Technology Vol. 2 (6), 2010, 466-471, polyurethane microcapsule with glycerol as the polyol component for encapsulated self-healing agent), trimethylolpropane, 1,2,6-hexanetriol or triethanolamine. Water soluble polyols with four, five or six hydroxyl groups include pentaerythritol (cf. Example 1.4), xylitol, and mannitol, to mention only a few illustrative compounds. Polyols such as polyvinyl alcohol that have even more reactive hydroxyl groups can also be used for the synthesis of the microcapsules of the invention (see Example 1.5). Such diol, triols and other polyols can be used individually or as a mixture in any possible combination, for example a mixture of a diol and a triol, a mixture of a diol with a polyol having four, five or six reactive hydroxyl groups, or a mixture of a diol, a triol and a polyol with four reactive hydroxyl groups. In case a polyol such as polyvinyl alcohol is used, this polyol can simultaneously also act as surfactant in a method of encapsulating a liquid isocyanate compound that is described in the following.

The invention also provides a method of encapsulating a liquid isocyanate compound in a polymer microcapsule. This method comprises
  forming an oil-in-water emulsion containing a mixture of a methylene diphenyl diisocyanate (MDI) prepolymer and the liquid isocyanate compound,
  adding a polyol to the oil-in-water emulsion, and
  polymerizing the methylene diphenyl diisocyanate (MDI) prepolymer with the polyol by interfacial polymerization to form the polymeric microcapsule, thereby encapsulating the liquid isocyanate compound in the formed polymeric microcapsule.

In this method, forming the oil-in-water emulsion may comprise adding the methylene diphenyl diisocyanate (MDI) prepolymer and the liquid isocyanate compound in aqueous solution that contains a surfactant. Any surfactant that is suitable for preparing a (stable) oil-in-water emulsion can be used in the method. Examples of suitable surfactants include gum arabic, polyvinyl alcohol, gellan gum, mesquite seed gum, gelatin, and mixtures thereof. The surfactant is typically present in a concentration up to the critical micelle concentration (CMC) of oil droplets in the oil-in-water emulsion and a suitable concentration can be determined empirically (see the Example Section). In case, a polyol such as polyvinyl alcohol that is also a reactive polyol that participates in the formation of the polyurethane shell of the microcapsule, the addition of the polyol to the reaction mixture of a methylene diphenyl diisocyanate (MDI) prepolymer and the liquid isocyanate compound and the formation of an oil-in-water emulsion can take place in one single step (cf. Example 1.5). In other embodiments, in which a polyol that does not have surfactant/emulsifying properties is used for the formation of the polyurethane shell of the microcapsule, the oil-in-water-emulsion can first be formed and the polyol is then added to this (stable) emulsion. In typical embodiments in which gum arabic is used, the gum arabic concentration is about 1 to 3 wt. % of the aqueous solution to which the MDI prepolymer and the liquid isocyanate are added. The isocyanate compound used in the method can be any if the isocyanate compound given above. Likewise the polyol can be any of the polyols mentioned above. The polyol is usually added as a diluted aqueous solution or as a pure liquid to the oil-in-water emulsion that has been heated to a suitable temperature that allows the interfacial polymerization reaction to take place. In order to carry out the polymerization at the oil/water interface, the polyol is typically added in portions (for example, dropwise) to the emulsion reaction mixture. The polymerization is carried out by maintaining the reaction mixture at a desired reaction temperature for a suitable period of time under agitation before the reaction is stopped by ending adding the polyol and/or cooling down the reaction mixture, for example.

In this context, the microencapsulation of the reactive isocyanate monomers is illustrated in more detail using, as an example, the interfacial polymerization between a MDI-based prepolymer and 1,4-butanediol. In line with the above, for example, a gum arabic aqueous solution is prepared as surfactant solution at room temperature. Target core material such as HDI or IPDI is mixed well with the MDI prepolymer to act as the oil phase, which is then added into the above surfactant solution under mechanical agitation to develop an oil-in-water emulsion. After stabilization, the emulsion system is heated to a set temperature, and then diluted 1,4-butanediol aqueous solution is added to initiate the polymerization reaction. With the addition of 1,4-butanediol into the aqueous continuous phase, the polymerization reaction between the hydroxyl functional group from the aqueous phase and isocyanate functional group from the oil phase takes place at the oil/water interface to produce a polymeric membrane surrounding the oil droplets in the emulsion. 1,4-butanediol in the aqueous phase can diffuse across the initial membrane to react with inner isocyanates, resulting in the membrane increment. Because MDI prepolymer is much more reactive than isocyanates such as HDI or IPDI, 1,4-butanediol preferably reacts with MDI prepolymer to form the shell structure, while the less reactive HDI liquid is encapsulated as core material to afford the final microcapsules. The reaction is stopped after a set period of time, and the resultant microcapsules are washed, filtered, dried and stored for later use.

The microcapsules of the invention can be used for any self-healing application in which a polymer formed by the liquid isocyanate compound after it is released from ruptured microcapsules is helpful. In one such embodiment, the microcapsules are used in a method of preventing or slowing corrosion. Such a method comprises applying a coating composition on a substrate, wherein the coating composition comprises polymeric microcapsules consisting of a polymerization product of methylene diphenyl diisocyanate (MDI) prepolymer with a polyol, the microcapsule comprising a liquid isocyanate compound encapsulated within the microcapsule. Again, any of the liquid isocyanate compounds that is mentioned above can be used in the method and in the coating compositions described here. Accordingly, the invention is also directed to a coating composition that comprises polymeric microcapsules consisting of a polymerization product of methylene diphenyl diisocyanate (MDI) prepolymer with a polyol, wherein the microcapsule comprises a liquid isocyanate compound encapsulated within the microcapsule.

The microcapsules described here can be present in any desired amount in the coating composition. They are usually present in an amount which is capable of providing the desired effect of preventing or decreasing the rate of corrosion. In typical embodiments the microcapsules may be comprised in the coating composition in an amount of in between about 1 to about 50 wt. %, for example in about 2, 3, 4, 5, 6, 7, 8, 9, 10, 12, 15, or 20 wt. % of the total weight of the coating composition.

In embodiments of this method, the coating composition comprises a resin. The resin is typically a resin that is used for protective coatings or paints applied to substrates such as steel or other metals that are, for example, used in the marine and offshore industry, the automotive industry, the aviation industry or for building purposes. For this purpose, the microcapsules described here can be added to any resin that is used as protective coating, for example, against corrosion and/or mechanical abrasion. To name only a few, examples of resins are epoxy resin, an acrylic resin, a phenolic resin, a polyurethane resin, an alkyd resin and a polyester resin, which all commercially available from numerous suppliers, for example, from Cytec Industries Inc. 5 Garret Mountain Plaza, Woodland Park, N.J. 07424, U.S.A or from Bayer Material Science AG, Leverkusen, Germany.

Embodiments of this method may further comprise curing the coating composition after the coating composition has been applied to the substrate to be protected from corrosion such as a steel substrate. The curing depends on the type of resin used and can be carried out by any conventional method that is known to the person of average skill in the art.

EXAMPLES

The following examples are solely provided in order to demonstrate and further illustrate certain preferred embodiments and aspects of the present invention and are by no means to be construed as limiting the scope thereof.

1. Materials

MDI prepolymer Suprasec 2644 was obtained from Huntsman. HDI, gum arabic, 1,4-butanediol, glycerol, pentaerythritol, polyvinyl alcohol, ethylenediamine and sodium chloride (NaCl) were obtained from Sigma-Aldrich. All chemicals were used in the experiments without further purification unless otherwise specified.

2. Synthesis of Microcapsules Containing HDI

Example 1.1

Synthesis of Encapsulated Microcapsules being Formed from MDI Prepolymer and 1,4-Butanediol as Polyol The microcapsules preparation was based on the interfacial polymerization reaction of Suprasec 2644 and 1,4-butanediol in an oil-in-water emulsion system. At room temperature, gum arabic aqueous solution was prepared as surfactant in a 250 ml beaker. The beaker was suspended in a temperature-controlled water bath on a programmable hot plate with an external temperature probe. The solution was agitated with a digital mixer (Caframo) driving a three-bladed propeller. 2.9 g of Suprasec 2644 liquid was mixed well with HDI, and the mixture was then added into the prepared surfactant solution under agitation to develop a stable emulsion system. After the addition, the system was heated to 40° C. at the heating rate of 7° C. min$^{-1}$, and 3.0 g of 1,4-butanediol, diluted in 3 ml deionized water, was dropwisely added into the emulsion to initiate the interfacial polymerization at the oil/water interface. The reaction was stopped after 60 min, and the resultant microcapsules were filtered and washed with distilled water for several times. Microcapsules were collected for air-drying at room temperature for 48 h before further analysis.

Example 1.2

Synthesis of Encapsulated Microcapsules being Formed from MDI Prepolymer and 1,4-Butanediol as Polyol At room temperature, 30 ml of 3 wt. % gum arabic aqueous solution was prepared as surfactant in a 250 ml beaker. The beaker was suspended in a temperature-controlled water bath on a programmable hot plate with an external temperature probe. The solution was agitated with a digital mixer (Caframo) driving a three-bladed propeller. 2.9 g of MDI prepolymer liquid is mixed well with 8.0 g of HDI, and the mixture was then added into the prepared surfactant solution under stirring at 800 RPM to develop an emulsion system. After the addition, the system was heated to 40° C. at the heating rate of 7° C./min, and 3.0 g of 1,4-butanediol, diluted in 3 ml deionized water, was dropwisely added into the emulsion to initiate interfacial polymerization at the oil/water interface. The reaction was stopped after 60 min, and the resultant microcapsules were filtered and washed with distilled water for three times. Microcapsules were air-dried at room temperature for 48 h before further analysis.

Example 1.3

Synthesis of Encapsulated Microcapsules being Formed from MDI Prepolymer and Glycerol as Polyol At room temperature, 30 ml of 3 wt % gum arabic aqueous solution was prepared as surfactant in a 100 ml beaker. The beaker was suspended in a temperature-controlled water bath on a programmable hot plate with an external temperature probe. The solution was agitated with a digital mixer (Caframo) driving a three-bladed propeller. 1.74 g of MDI prepolymer liquid was mixed well with 4.8 g of HDI, and the mixture was then added into the prepared surfactant solution under stirring at 800 rpm to develop an emulsion system. After the addition, the system was heated to 40° C. at the heating rate of 7° C./min, and 1.8 g of glycerol, diluted in 1.8 g deionized water, was dropwisely added into the emulsion to initiate interfacial polymerization at the oil/water interface. The reaction was stopped after 80 min, and the resultant microcapsules were filtered and washed with distilled water for three times. Microcapsules were air-dried at room temperature for 24 h before further analysis.

Example 1.4

Synthesis of Encapsulated Microcapsules being Formed from MDI Prepolymer and Pentaerythritol as Polyol At room temperature, 30 ml of 3 wt % gum arabic aqueous solution was prepared as surfactant in a 100 ml beaker. The beaker was suspended in a temperature-controlled water bath on a programmable hot plate with an external temperature probe. The solution was agitated with a digital mixer (Caframo) driving a three-bladed propeller. 1.74 g of MDI prepolymer liquid was mixed well with 4.8 g of HDI, and the mixture was then added into the prepared surfactant solution under stirring at 800 rpm to develop an emulsion system. After the addition, the system was heated to 40° C. at the heating rate of 7° C./min, and 1.8 g of pentaerythritol, diluted in 18 g deionized water, was dropwisely added into the emulsion to initiate interfacial polymerization at the oil/water interface. The reaction was stopped after 90 min, and the resultant microcapsules were filtered and washed with distilled water for three times. Microcapsules were air-dried at room temperature for 24 h before further analysis.

Example 1.5

Synthesis of Encapsulated Microcapsules being Formed from MDI Prepolymer and Polyvinyl Alcohol (PVA) as Polyol and Surfactant At 90-100° C., 30 ml of 3 wt. % PVA aqueous solution was prepared as surfactant in a 100 ml beaker. The beaker was suspended in a temperature-controlled water bath on a programmable hot plate with an external temperature probe. The solution was agitated with a digital mixer (Caframo) driving a three-bladed propeller at room temperature. The 2.69 g of MDI prepolymer liquid is mixed well with 5.4 g of HDI, and the mixture was then added into the prepared surfactant solution under stirring at 600 rpm to develop an emulsion system. After the addition, the system was heated to 40° C. at the heating rate of 7° C./min, and the interfacial polymerization at the oil/water interface was initiated. The reaction was stopped after 60 min, and the resultant microcapsules were filtered and washed with distilled water for three times. Microcapsules were air-dried at room temperature for 24 h before further analysis.

Morphology and Statistic Parameters of HDI Microcapsules

The microcapsule formation during the reaction process was observed under an Axiotech optical microscope (Zeiss) equipped with a device camera (Sony). The surface morphology and shell thickness were examined by using scanning electron microscopy (JEOL JSM 5600LV SEM). Mean diameter of the microcapsules and their size distribution were determined from data sets of at least 200 measurements from SEM images and analyzed in ImageJ.

Yield and Components of HDI Microcapsules

Since the synthesis of the capsule shell wall is not a strict stoichiometric reaction, excess of 1,4-butanediol was used to ensure the Suprasec 2644 was completely consumed, and the yield of the synthesis is calculated simply as below:

$$\text{Yield}(\%) = \frac{W_{cap}}{W_{pre-p} + W_{diol} + W_{HDI}} \times 100\%$$

where $W_{cap}$ is the mass of the collected microcapsules after drying, and $W_{pre-p}$, $W_{diol}$, $W_{HDI}$ are the masses of prepolymer, butanediol, and HDI, respectively. This is a rough method to compare the operating factor of the raw materials, which will bring more deviation at higher agitation rates and be explained in the latter section. Constituents of the microcapsules were analyzed by using Fourier Transform Infrared Spectroscopy (FTIR, Varian 3100). Small amounts of pure HDI, pure prepolymer, pure capsule shell, pure capsule core material and full capsules mixed with KBr pellet were prepared separately. The spectrum in the range of 400 cm$^{-1}$ to 4000 cm$^{-1}$ was used for the observation. In order to obtain the FTIR spectrum of pure capsule shell, small amounts of microcapsules were crushed and washed by ethanol for a few times. After filtration and drying, pure shell was obtained for analysis.

Thermal Property and Core Fraction of HDI Microcapsules

The thermal stability and the HDI content of the resultant microcapsules were characterized by using thermogravimetric analysis (TGA, Hi-Res Modulated TGA 2950). 10-20 mg of microcapsules was put in a platinum pan and heated under nitrogen atmosphere at a rate of 10° C. min$^{-1}$ The peak width of the derivative of the weight loss curve of capsules was used to roughly determine the core fraction of microcapsules. Pure capsules shell was obtained using the same way as that for FTIR analysis.

Preparation and Observation of Anticorrosion Self-Healing Coatings

Anticorrosion self-healing coatings were prepared by dispersing 10 wt % of synthesized microcapsules into epoxy resin (EPOLAM 5015/5014, AXSON) at ambient temperature, followed by mixing hardener. The mixture was then placed under vacuum for degassing for 20 min. A steel panel was polished by sand paper, degreased by acetone, and then washed by distilled water. After drying, the panel was coated by the degassed self-healing coating with the final thickness of 300-350 µm. After curing, cross scratches were applied manually on the coating by razor blade. Pure epoxy coating was prepared as a control. Specimens coated with both formulations were immersed in 10 wt. % NaCl solution for 48 h to evaluate the accelerated corrosion process. Optical photography was used to observe the different corrosion performances of the steel panel coated with self-healing coating and with neat epoxy coating. SEM was also employed to inspect the evolution of the scratched area of the coating to provide detailed information about the corrosion process.

Corrosion Protection Assessment of Self-Healing Coating

Following the procedure described above, epoxy coated steel panels are prepared. Scribes are applied to the coating, and then the scribed panels are placed in 10 wt. % NaCl solution for 48 hours to accelerate corrosion process. The scribed areas are inspected by scanning electron microscope (SEM) to examine the self-healing performance in the scribes. Control samples are also prepared by coating neat epoxy containing no microcapsules on steel panels, and the coated panels are treated in the same manner.

3. Results and Discussion 3.1. Overview of the Synthesized Microcapsules

In the synthesis, Suprasec 2644 was dissolved in HDI to yield an oil phase, which was dispersed into gum arabic surfactant solution or polyvinyl alcohol to generate an oil-in-water emulsion. When 1,4-butanediol, glycerol or pentaerythritol was introduced as polyol, the primary polymerization reaction between the hydroxyl functional group of this polyol (diol, triol or polyol with four hydroxyl groups) in the aqueous phase and isocyanate functional group in the oil phase would take place at the oil/water interface to produce a polymeric membrane surrounding the oil droplets. The diol in the aqueous phase thereafter diffused across the initial membrane to react with the isocyanates and resulted in the membrane increment. MDI prepolymer was much more reactive than HDI, and hence the primary reaction was between polyol such as 1,4-butanediol, glycerol or pentaerythritol and prepolymer to form the shell structure, while the relatively less reactive HDI liquid was encapsulated as core material to produce the final microcapsules. In addition, there were a few side reactions between NCO groups from prepolymer, HDI, and intermediate polyisocyanates and hydroxyl groups from polyol and water. Among those, the side reaction for example between reactive NCO groups and water would eventually produce a mixture of polyurethane and polyurea as shell wall. Actually some bubbles were observed upon the completion of the microencapsulation process, indicating carbon dioxide was produced in the side reaction between NCO groups and water. However, an identification of the precise chemical compositions of the polyurethane shell wall material has not yet been carried out. In a typical run of synthesis, the microcapsules were obtained by adding 8 g of HDI in 3 wt. % gum arabic solution at the agitation rate of 500 RPM and the temperature of 40° C. and reacting for 1 h. At such a condition, the yield of the capsules was about 70 wt. %, and the resultant microcapsules had average diameter of 86.5 μm and shell thickness of about 6.5 μm.

3.1.1 Morphology

Figure 1D:
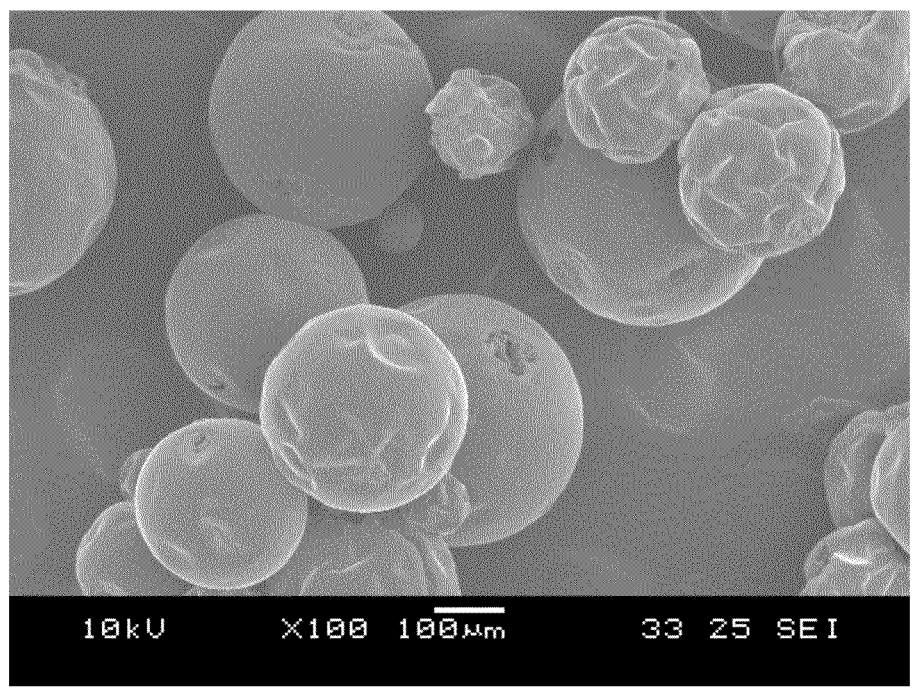
Figure 1E:
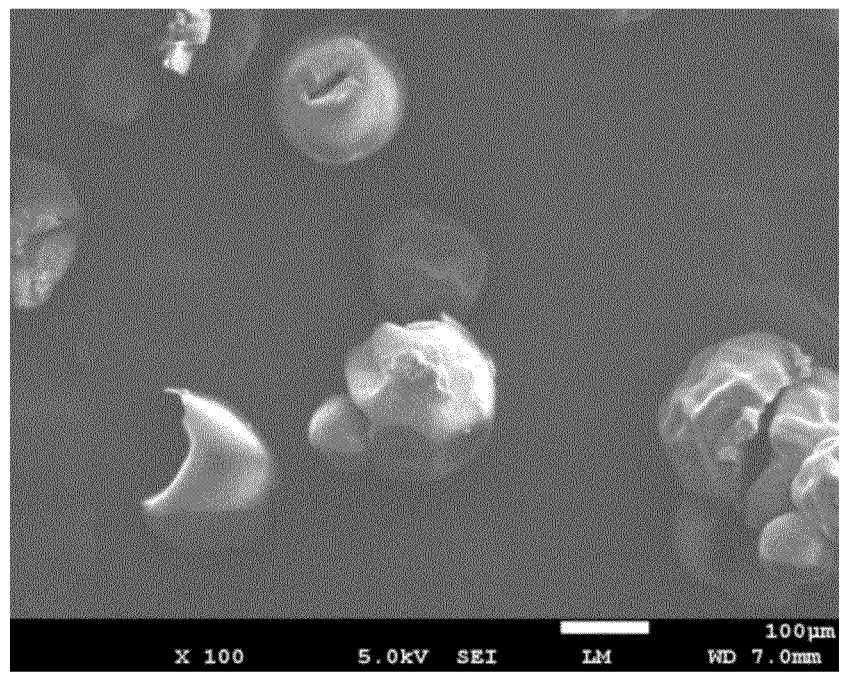
Figure 1F:
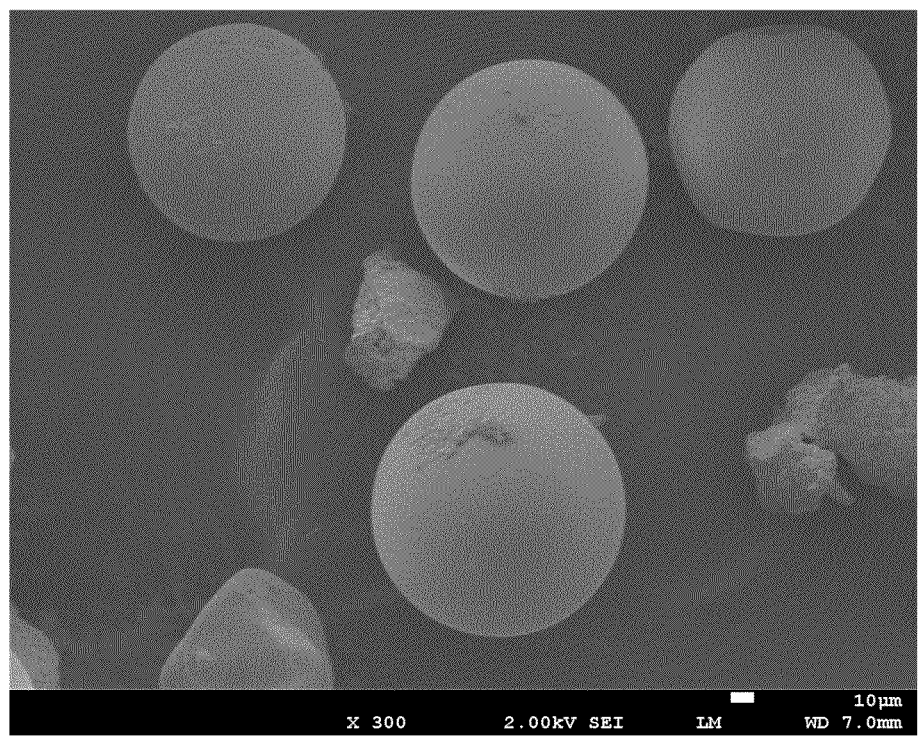

Nearly spherical shaped microcapsules were synthesized in the polymerization reaction of MDI prepolymer and 1,4-butanediol with size distribution as shown in FIG. 1a. It is seen that the outer surface of the capsules is quite smooth (FIG. 1c) compared with those synthesized using other approaches (E. Brown, M. Kessler, N. Sottos and S. White, J. Microencapsulation, 2003, 20, 719-730; J. Yang, M. W. Keller, J. S. Moore, S. R. White and N. R. Sottos, Macromolecules, 2008, 41, 9650-9655). Meanwhile, the shell wall thickness is roughly uniform and in the micron meter level, which acts as an appropriate barrier from leakage and provides enough mechanical stiffness from rupture during post processing. As seen from FIG. 1(d), FIG. 1(e), and FIG. 1(f) also the microcapsules of the invention prepared from MDI prepolymer and glycerol, from MDI prepolymer and pentaerythritol, and from MDI prepolymer and polyvinyl alcohol have a nearly spherical shape. While the following discussing refers to the characterization of microcapsules that were synthesized by polymerization reaction of MDI prepolymer and 1,4-butanediol, it is to be understand that this discussion is purely illustrative and the other microcapsules described here have similar properties.

3.1.2 Yields and Determination of Capsule Components

Figure 2:
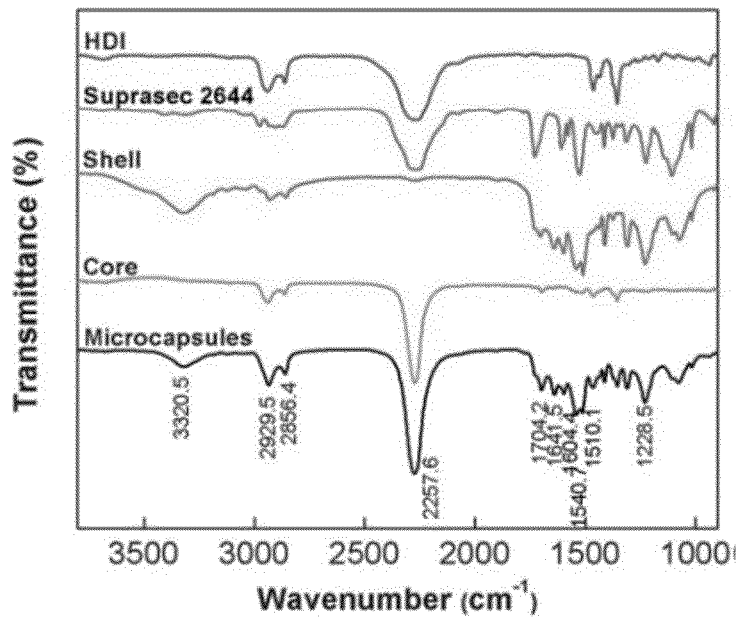
FIG. 2 shows Fourier Transform Infrared Spectroscopy (FTIR) spectra of prepared microcapsules of an embodiment of the invention, capsule shell and capsule core of the prepared microcapsules, as well as of Suprasec 2644 and HDI.

According to the calculation discussed above, at 500 RPM agitation rate, the typical yield was around 70 wt %. A more detailed analysis is given below to show that the product yield was slightly dependent on agitation rate. The chemical structure of the resultant microcapsules was characterized by FTIR. For comparison, complete capsules together with pure grades of HDI, prepolymer, shell and core materials were investigated, as shown in FIG. 2. The nearly identical spectrum curves of HDI and core material indicated that HDI was successfully encapsulated and no MDI prepolymer was included since the signal peaks at 1641.5 $cm^{-1}$, 1540.7 $cm^{-1}$ were not detected. From the spectrum of shell, the characteristic signal at 2267.6 $cm^{-1}$ (—NCO stretch) was not observed, indicating the prepolymer chains were extended to form polyurethane bulk shell. Large amounts of HDI monomer released upon squeezing the microcapsules indicated that HDI played a minor role in the shell forming process. From the large —NCO stretching peak of the spectrum of complete capsules, it was logical to confirm again that HDI was encapsulated.

3.1.3 Thermal Property and Core Fraction of Microcapsules

Figure 3:
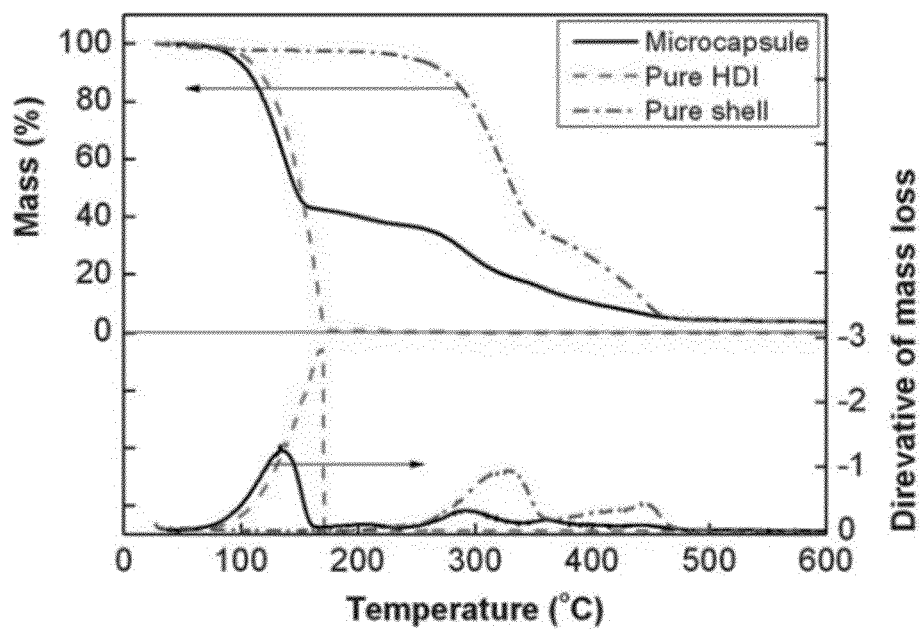
FIG. 3 shows the thermogravimetric analysis (TGA) weight loss of pure HDI and prepared microcapsules, and the derivative of TGA curve of microcapsules.

The TGA weight loss curves of microcapsules synthesized at 500 RPM along with pure HDI and capsule shell material as a function of temperature are shown in FIG. 3. It can be observed that microcapsules experienced significant weight loss by 180° C., which is in good agreement with that of pure HDI, revealing the successful encapsulation of HDI within the microcapsules. The decomposition of shell materials started from about 240° C.

The derivative of the weight loss curve of microcapsules was also plotted in FIG. 3, clearly showing the evaporation process of HDI in the first peak and decomposition process of shell in the peaks after 240° C. From the peak width of the derivative curve, the core fraction of the microcapsules was determined to be around 62% at 500 RPM.

3.1.4 Reactivity of Core Material

When the resultant microcapsules were crushed between two microscope slides, a large amount of liquid was observed to be released with irritating odor. After addition of a few droplets of ethylenediamine, it was found that the released liquid hardened rapidly with the production of heat, indicating that the encapsulated HDI was still reactive. When the core material was released on a moist glass slide, a whitish solid polymer layer appeared after a few hours, indicating the potential for self-healing application especially in a humid environment.

3.2. Parametric Study and Optimal Microencapsulation Procedure 3.2.1 Determination of Minimum Reaction Time (MRT)

The formation of microcapsules was rather fast in the synthesis due to the high reactivity of MDI prepolymer. Optical microscopy (OM) examination during the reaction period showed that microcapsules formed within 15 min after the addition of 1,4-butanediol. However, the MRT was necessary to know for both time saving and quality control of shell wall. To determine the MRT, products were sampled from the emulsion solution at 10 min intervals and observed under microscope until dispersed dry microcapsules could be collected following normal product collection operation. Although microcapsules were observed at quite early stage, the capsules formed before the MRT were found to collapse to yield viscous bulky polymer during the filtration. The required MRT at different reaction temperature was plotted in FIG. 4, and it can be seen that the MRT reduced steadily from 150 min to 30 min when the reaction temperature increased from 30° C. to 60° C., respectively.

3.2.2 Optimal Reaction Temperature.

Figure 4:
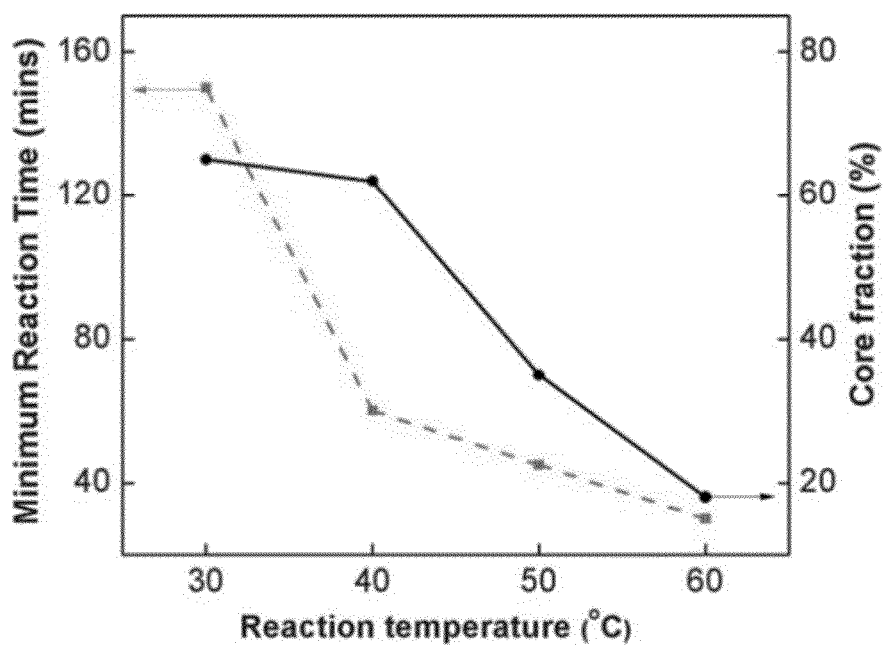
FIG. 4 shows minimum reaction time (MRT) for the synthesis and core fraction of prepared microcapsules as a function of reaction temperature.

Reaction temperature had considerable influence on the core content in the resultant microcapsules. As shown in FIG. 4, the core fraction increased from 18% to 65% when the reaction temperature was reduced from 60° C. to 30° C. during the capsules synthesis. This variation in the core fraction was probably due to the side reactions between 1,4-butanediol and HDI, and water and NCO groups. As discussed above, the shell materials were primarily based on the reaction of 1,4-butanediol with MDI prepolymer, but the reaction with less reactive HDI was also unavoidable especially at elevated temperature. In addition, at high temperature water molecules might easily diffuse into capsules and react with HDI to produce polyurea via the intermediate product of amines and carbon dioxide. By consideration of most robust microcapsules with highest core content synthesized in minimum reaction time, it was reasonable to choose 40° C. as the optimal reaction temperature from the present study.

3.2.3 Initial Mass of Core Material

Figure 5:
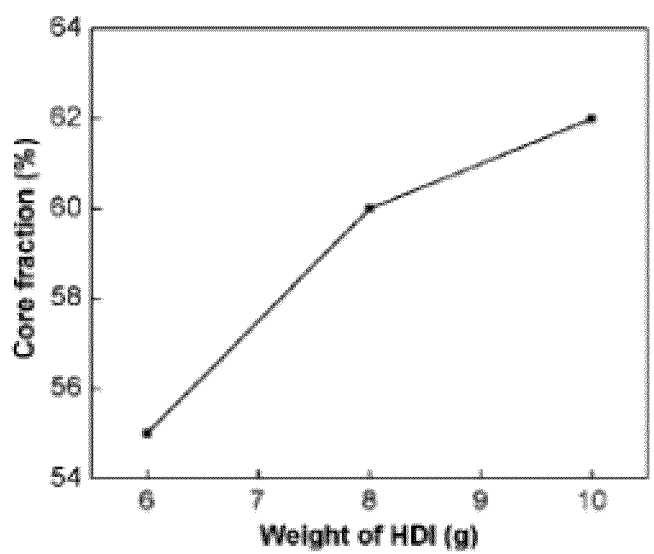
FIG. 5 shows the core fraction of microcapsule as a function of the amount of HDI in the reaction mixture.

The core material content of microcapsules can also be controlled by adjusting the amount of HDI in the recipe. As illustrated in FIG. 5, higher fill content in the final capsules was obtained when more HDI was added, showing a nonlinear relationship. It is a natural process that when more oil phase is dispersed into aqueous solution, more oil droplets are formed. However, there will be an optimal value to obtain robust microcapsules since the amount of shell materials is constant. A direct consequence of using more HDI was that more aggregation microcapsules appeared with low quality although the core content was a bit higher. This observation was in accordance with a previous investigation (H. Johnsen and R. B. Schmid, J. Microencapsulation, 2007, 24, 731-742)

3.2.4 Influence of Surfactant Concentration

On Geometries of Microcapsules

Figure 6:
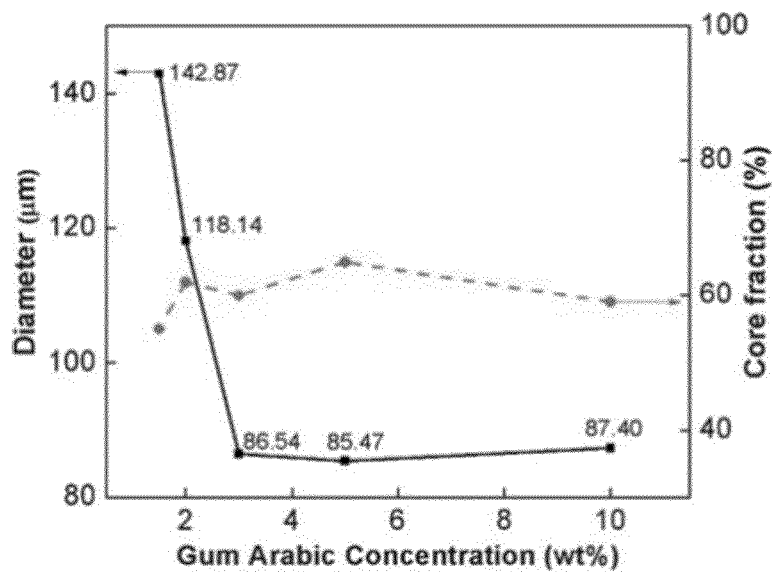
FIG. 6 shows the diameter and core fraction of microcapsules of an embodiment of the invention prepared at different concentration of gum arabic.

The concentration of surfactant greatly influenced the diameter of the resultant microcapsules. As shown in FIG. 6, microcapsules diameter decreased dramatically when the gum arabic concentration increased from 1.5 to 3 wt. %, followed by a plateau with constant diameter around 85 μm when the surfactant concentration was above 3 wt. %. The exact mechanism by which surfactant concentration influences the capsules formation is still not clear, but it is widely accepted that the surfactant concentration is a dominant factor influencing the interfacial tension of the emulsion media before the critical micelle concentration (CMC) is reached (Y. M. Kuo, C. T. Wu, W. H. Wu and D. Y. Chao, J. Appl. Polym. Sci., 1994, 52, 1165-1173; H. Yoshizawa, E. Kamio, N. Hirabayashi, J. Jacobson and Y. Kitamura, J. Microencapsulation, 2004, 21, 241-249). It is believed that higher surfactant concentration yields smaller oil droplets in an oil-in-water emulsion, and as a result, the microcapsules produced via interfacial reaction will have smaller diameters (S. Tcholakova, N. D. Denkov and T. Danner, Langmuir, 2004, 20, 7444-7458). Beyond the CMC, further increase in surfactant concentration will not change the interfacial tension and the size of dispersed droplets in the emulsion system, and therefore the diameter of final microcapsules will approximately maintain a constant value. From the present systems, it was indicated that the CMC of gum arabic was around 3 wt. %.

On Core Fraction of Microcapsules

Although surfactant concentration significantly influenced the capsules diameter, it only slightly affected the core fraction. As compared in FIG. 6, the HDI fraction in the final microcapsules changed from 58% to 63% when the gum arabic concentration varied in the range of 1.5-10 wt %.

3.2.5 Influence of Agitation Rate

On Yields of Microcapsules

Figure 7:
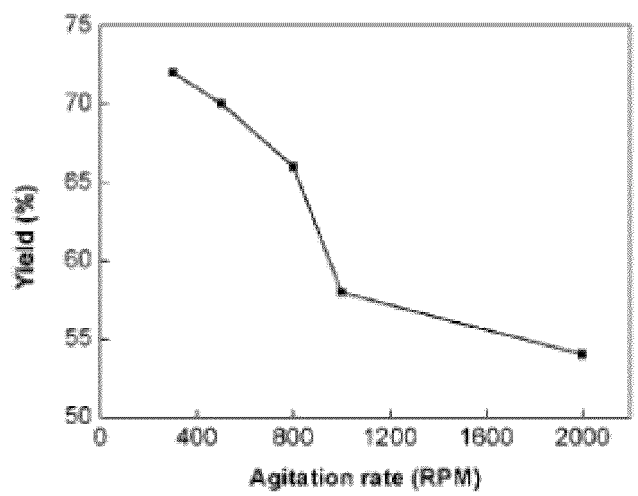
FIG. 7 shows the yield of microcapsules (in %) prepared in embodiments of the invention versus the agitation rate (rotations per minutes, RPM) of the reaction mixture.

It was found that the yields of microcapsules varied from 74 to 54 wt. % when the agitation rates ranged from 300 to 2000 RPM, respectively, as shown in FIG. 7. It is likely attributable to two reasons. First of all, more microcapsules after formation might be destroyed by the higher shear force under faster agitation (E. Brown, M. Kessler, N. Sottos and S. White, J. Microencapsulation, 2003, 20, 719-730). Secondly, during the product collection, a large portion of tiny capsules were not collected in the process of filtration and washing. As discussed below, it was found herein that a finer microcapsule will be produced at higher agitation rate, and accordingly more tiny capsules would escape from our collection, resulting in the lower yield. As mentioned above, the yield calculation was a rough estimation. The yield at 2000 RPM agitation rate was approximately 54%.

On Geometries of Microcapsules.

Figure 8:
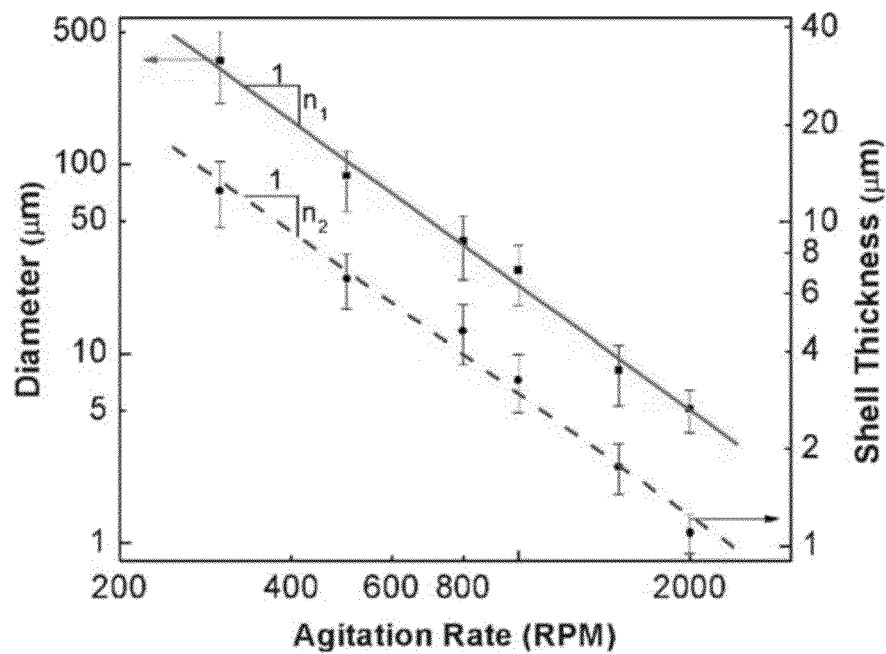
FIG. 8 shows the diameter and shell thickness of microcapsules of embodiments of the invention prepared at different agitation rate in ($n_1$=2.18; $n_2$=1.25)
Figure 9:
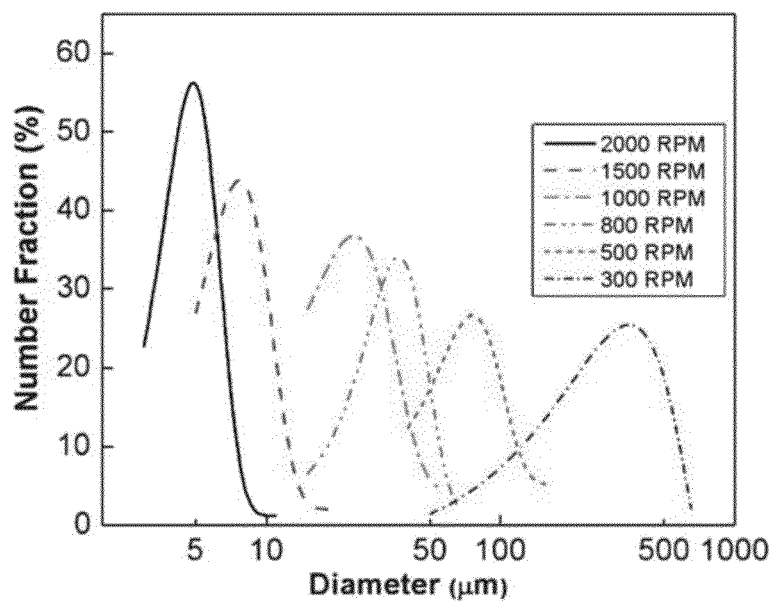
FIG. 9 shows the size distributions of microcapsules of embodiments of the invention prepared at different agitation rates.

In the development of self-healing materials through microencapsulation, proper control of capsule diameter is a key issue because the diameter greatly influences the self-healing performance (J. Rule, N. Sottos and S. White, Polymer, 2007, 48, 3520-3529) and in some conditions, only the capsules with a given range of diameters are suitable. The microcapsules diameter is influenced by a combination of several factors including the geometry of the mixing device, viscosity of the reaction media, surfactant concentration, agitation rate, temperature, etc., and from the above discussions, it was seen that the gum arabic concentration greatly influenced the microcapsules size. However, the average diameter of microcapsules was primarily controlled by the agitation rate after all other parameters were optimized. As illustrated in FIG. 8 and FIG. 9, higher agitation speed resulted in smaller microcapsule size and narrower size distribution, and this result was in line with those previously reported (E. Brown, M. Kessler, N. Sottos and S. White, J. Microencapsulation, 2003, 20, 719-730; J. Yang, M. W. Keller, J. S. Moore, S. R. White and N. R. Sottos, Macromolecules, 2008, 41, 9650-9655). At higher agitation rate, finer oil droplets formed in the emulsion system due to the stronger shear force, and the final microcapsules were accordingly smaller. Meanwhile, faster agitation was more favorable for the homogenization of the emulsion, and therefore the diameter distribution of the produced microcapsules was more uniform. Microcapsules with average diameter in the range of 5-350 μm were obtained by adjusting agitation rate from 300 to 2000 RPM. The relation between average diameter and agitation was linear in the double logarithm coordinates, similar to the previous research (E. Brown, M. Kessler, N. Sottos and S. White, J. Microencapsulation, 2003, 20, 719-730).

The average shell thickness of the resultant microcapsules as a function of agitation rate was also plotted in FIG. 8, which clearly illustrated that the shell thickness reduced with the increase of agitation rate following a linear relation in double logarithm coordinates. As stated above, finer oil droplets were generated at higher agitation rate, and their specific surface area was larger. Given the total amount of core materials and shell materials remained constant, the amount of shell materials surrounding each oil droplet would therefore be smaller, resulting in the thinner shell wall of the final microcapsules. The average shell thickness of capsules was in the range of 1.1-12.5 µm when the agitation rate varied from 300 to 2000 RPM. The relation between average diameter and agitation rate was consistent with the previous observations (J. Yang, M. W. Keller, J. S. Moore, S. R. White and N. R. Sottos, Macromolecules, 2008, 41, 9650-9655).

On Core Fractions of Microcapsules

Figure 10:
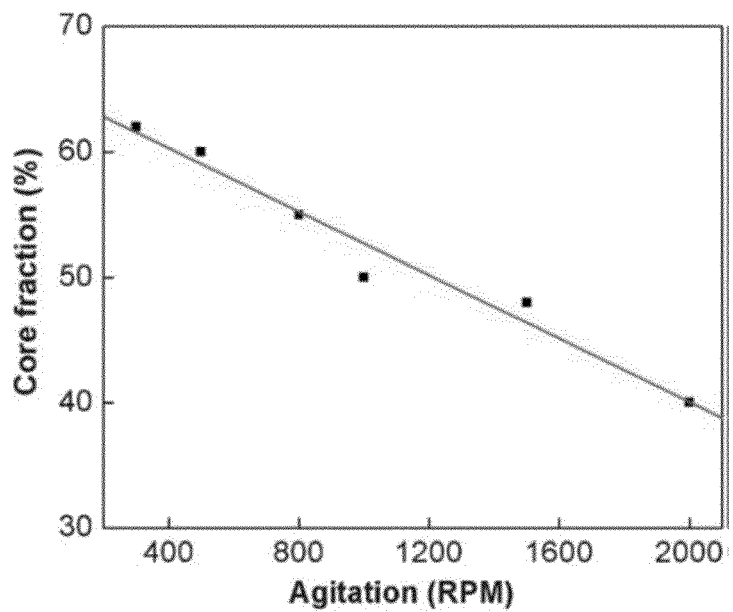
FIG. 10 shows the core fraction (in %) of microcapsules of embodiments of the invention prepared at different agitation rate.

The agitation rate also influenced the core fractions of the resultant microcapsules. As shown in FIG. 10, faster agitation led to lower core fractions, and the HDI content in the capsules reduced from 62% to 40% when the agitation rate was increased from 300 to 2000 RPM. The reason might be that the diffusion of 1,4-butanediol and maybe water across the thinner capsule shells produced at higher agitation rates was easier and accordingly more HDI reacted with the diol. As a result, the core fraction in the final capsules was lower at higher agitation rate.

3.3. Environmental Stability of HDI Microcapsules 3.3.1 In Aqueous Solution

Figure 11:
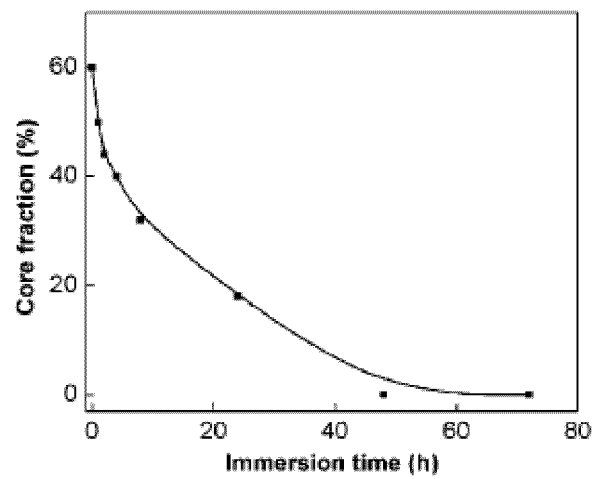
FIG. 11 shows the core fraction (in %) of microcapsules after immersion in water for different time.
Figure 12:
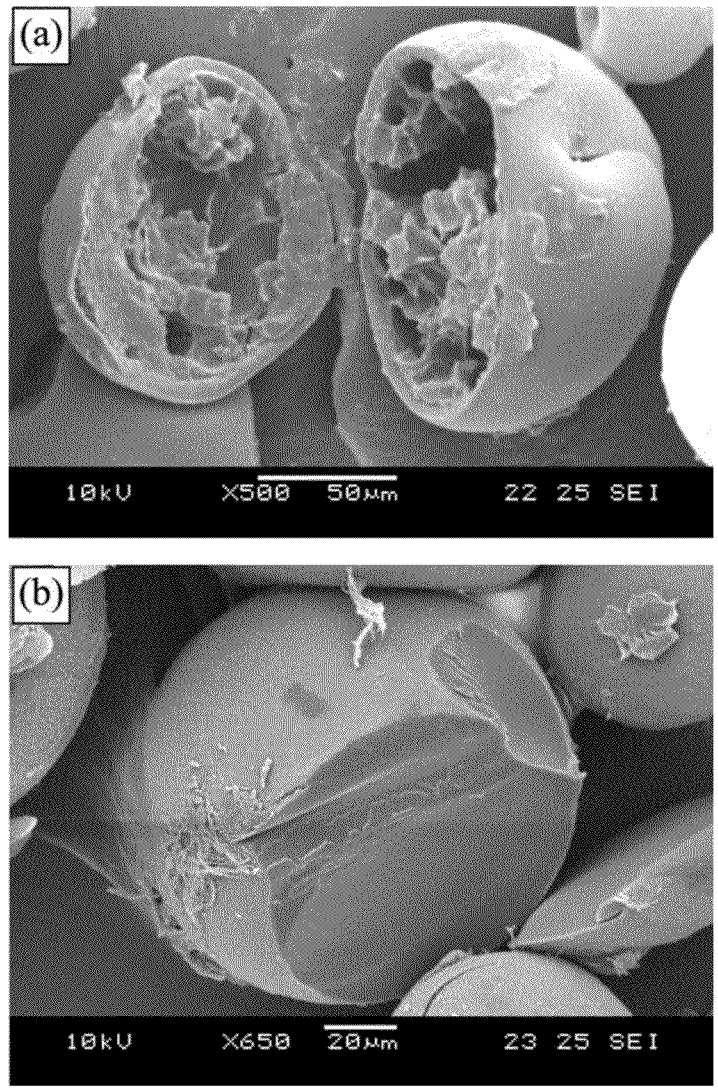
FIG. 12 shows the scanning electron microscopy (SEM) images of microcapsules after 24 h (FIG. 12a) and after 48 h (FIG. 12b) immersion in water.

To investigate the stability of these capsules in a wet environment, the capsules were analyzed by TGA after they were immersed in water for a period of time. As revealed in FIG. 11, the core fraction reduced steadily with the immersion time and dropped to zero after 48 h immersion. The probable reason was that water diffused across the microcapsule wall and reacted with the encapsulated HDI, which was further proved by the SEM images of the change of the core morphology of microcapsules after immersion. As shown in FIG. 12, the core materials were solidified and eventually formed solid beads (FIG. 12b).

3.3.2 Shelf Life

When the microcapsules were exposed to the open air at room temperature for 1 month, the HDI content dropped from 60% to 45%. This observation showed the high permeability of the microcapsules, and further optimization is still required to minimize the permeability in order to better protect the encapsulated core materials.

3.4. Preliminary Self-Healing Performance in Anticorrosion Coating

Figure 13:
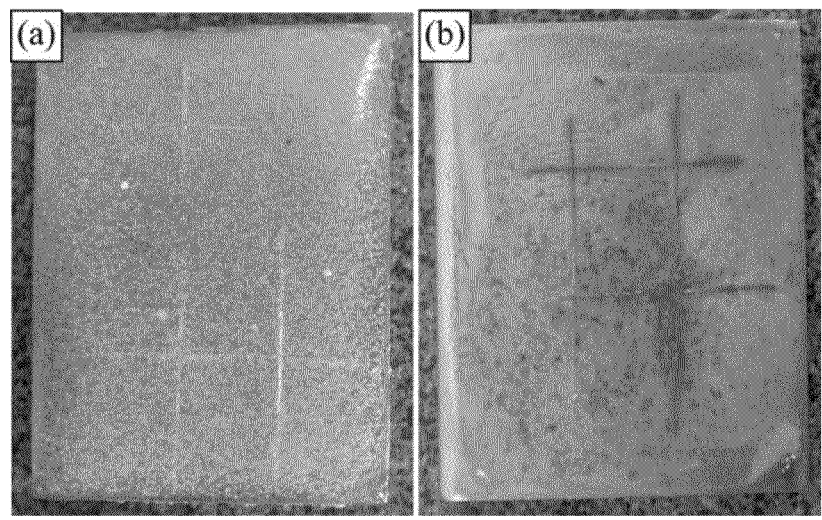
FIG. 13 shows corrosion test results for steel panels coated with epoxy coating mixed with 10 wt. % of prepared HDI-filled microcapsules according to an embodiment of the invention (FIG. 13a) and control epoxy coating (FIG. 13b). The panels shown in FIG. 13 were immersed in 10% NaCl solution for 48 h.
Figure 14:
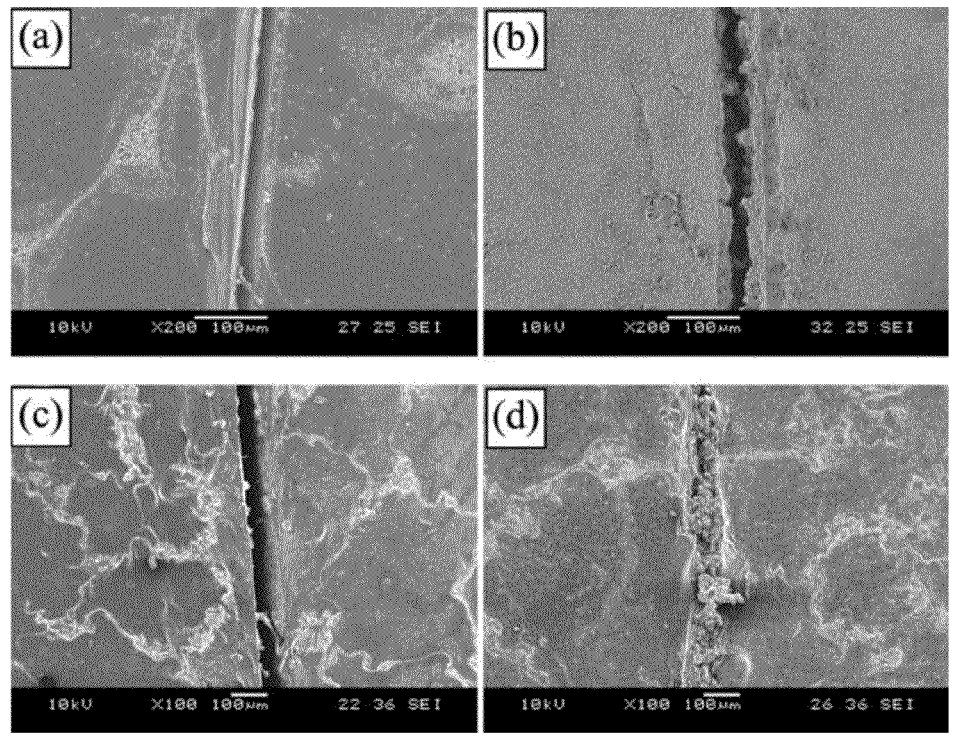
FIG. 14 shows SEM images of the scratched regions before immersion (FIG. 14a: control coating, FIG. 14c: self-healing coating) and after immersion in salt water for 48 h (FIG. 14b: control coating, FIG. 14d: self-healing coating).

The prepared microcapsules were integrated into an epoxy resin to create a self-healing coating, and a preliminary test was carried out to evaluate the self-healing and anti-corrosion performance. It can be seen from FIG. 13 that the scratched area of the steel panel coated with self-healing coating was nearly fully free of corrosion after 48 h immersion in salt solution. In contrast, severe corrosion was seen in the control specimen. This result clearly demonstrated the excellent corrosion protection of the prepared coating towards the steel panel. From the SEM images of the scratched area of the coated panels (FIG. 14), it was illustrated that newly formed materials filled the crack. The crack was in this way sealed and healed autonomously to retard the diffusion of salt ions and thus protect the substrate from the corrosion process. The materials generated in the crack should be the product between HDI released from ruptured microcapsules and water. As a comparison, it could be seen that the crack of the control specimen was not sealed and severe rust was observed.

Therefore, it could be concluded that the anti-corrosion function of the coating is from its self-healing property. The healing behavior of the microcapsules-embedded epoxy coating was completely autonomous without any external intervention such as heating or UV exposure, and it did not require catalyst or other assisting materials either, making it easier for the development of self-healing materials, which is of considerable technical and commercial importance.

Conclusion of the Experimental Results:

A procedure for optimal microencapsulation of HDI via interfacial polymerization reaction of MDI prepolymer and polyols such 1,4-butanediol, glycerol, pentaerythritol or polyvinylalcohol in an oil-in-water emulsion was facilely achieved for self-healing application. The yield of the synthesis was about 70% and dependent on reaction parameters. Spherical microcapsules with the diameter in the range of 5-350 µm and shell thickness in the range of 1-15 µm were prepared by adjusting agitation rate from 300 to 2000 RPM. The average diameter and shell thickness of the microcapsules both possessed a linear relationship with agitation rate in double logarithm coordinates. HDI content of the resultant capsules was around 60 wt. %, and it was inversely related to the reaction temperature. Microcapsules incorporated epoxy coating on a steel substrate showed excellent corrosion protection under an accelerated corrosion process via a self-sealing/healing mechanism, revealing the great potential of this facile microencapsulation technique in development of catalyst-free, one-part self-healing coatings for corrosion control.

The invention illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by exemplary embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims. In addition, where features or aspects of the invention are described in terms of Markush groups, those skilled in the art will recognize that the invention is also thereby described in terms of any individual member or subgroup of members of the Markush group.

What is claimed is:

1. A polyurethane microcapsule consisting of a polymerization product of only methylene diphenyl diisocyanate (MDI) prepolymer with a polyol, the polyurethane microcapsule comprising a liquid isocyanate compound encapsulated within the microcapsule; wherein the isocyanate is not isophorone diisocyanate.

2. The microcapsule of claim 1, wherein the isocyanate is selected from the group consisting of diisocyanate, methane diphenyl diisocyanate (MDI), hexamethylene diisocyanate (HDI), toluene diisocyanate (TDI), hydrogenate MDI, hexahydrotoluylene diisocyanate ($H_6$TDI), trimethyl hexamethylene diisocyanate, tetramethyl xylylene isocyanate, tetramethyl xylylene diisocyanate, xylylene diisocyanate, isocyanate dimers, isocyanate trimers, polyisocyanates, polydiisocyanates and combinations thereof.

3. The microcapsule of claim 1, wherein the isocyanate is unblocked.

4. The microcapsule of claim 1, wherein the isocyanate is hexamethylene diisocyanate.

5. The microcapsule of claim 1, wherein the polyol is selected from the group consisting of a diol, a triol and a polyol having four reactive hydroxyl groups.

6. The microcapsule of claim 1, wherein the diol is selected from the group consisting of 1,4-butanediol, ethylene glycol, diethylene glycol, triethylene glycol, tetraethylene glycol, propylene glycol, tripropylene glycol, 1,3-propanediol, 1,3-butanediol, 1,4-butanediol, neopentyl glycol, 1,6-hexanediol, and 1,4-cyclohexanedimethanol.

7. The microcapsule of claim 1, wherein the triol is selected from the group consisting of glycerol, trimethylolpropane, 1,2,6-hexanetriol and triethanolamine.

8. A method of encapsulating a liquid isocyanate compound in a polymer microcapsule, the method comprising
forming an oil-in-water emulsion containing a mixture of only methylene diphenyl diisocyanate (MDI) prepolymer and the liquid isocyanate compound,
adding a polyol to the oil-in-water emulsion, and
polymerizing the methylene diphenyl diisocyanate (MDI) prepolymer with the polyol by interfacial polymerization to form the polymeric microcapsule, thereby encapsulating the liquid isocyanate compound in the formed polymeric microcapsule;
wherein the isocyanate is not isophorone diisocyanate.

9. The method of claim 8, wherein forming the oil-in-water emulsion comprises adding the methylene diphenyl diisocyanate (MDI) prepolymer and the liquid isocyanate compound an aqueous solution containing a surfactant.

10. The method of claim 9, wherein the surfactant is gum arabic.

11. The microcapsule of claim 8, wherein the isocyanate is selected from the group consisting of diisocyanate, methane diphenyl diisocyanate (MDI), hexamethylene diisocyanate (HDI), toluene diisocyanate (TDI), hydrogenate MDI, hexahydrotoluylene diisocyanate ($H_6TDI$), trimethyl hexamethylene diisocyanate, tetramethyl xylylene isocyanate, tetramethyl xylylene diisocyanate, xylylene diisocyanate, isocyanate dimers, isocyanate trimers, polyisocyanates, polydiisocyanates and combinations thereof.

12. The method of claim 8, wherein the polyol is a selected from the group consisting of a diol, a triol and a polyol having four reactive hydroxyl groups.

13. The method of claim 12, wherein the diol is selected from the group consisting of 1,4-butanediol, ethylene glycol, diethylene glycol, triethylene glycol, tetraethylene glycol, propylene glycol, tripropylene glycol, 1,3-propanediol, 1,3-butanediol, 1,4-butanediol, neopentyl glycol, 1,6-hexanediol, and 1,4-cyclohexanedimethanol.

14. A coating composition comprising polymeric microcapsules consisting of a polymerization product of only methylene diphenyl diisocyanate (MDI) prepolymer with a polyol, the microcapsule comprising a liquid isocyanate compound encapsulated within the microcapsule;
wherein the isocyanate is not isophorone diisocyanate.

* * * * *